US009473812B2

(12) United States Patent
Hosur

(10) Patent No.: US 9,473,812 B2
(45) Date of Patent: Oct. 18, 2016

(54) SYSTEM AND METHOD FOR DELIVERING CONTENT

(75) Inventor: Prabhudev I. Hosur, Austin, TX (US)

(73) Assignee: Imagine Communications Corp., Frisco, TX (US)

( * ) Notice: Subject to any disclaimer, the term of this patent is extended or adjusted under 35 U.S.C. 154(b) by 1038 days.

(21) Appl. No.: 12/208,122

(22) Filed: Sep. 10, 2008

(65) Prior Publication Data

US 2010/0070608 A1 Mar. 18, 2010

(51) Int. Cl.
G06F 15/16 (2006.01)
H04N 21/435 (2011.01)
G06F 17/30 (2006.01)
H04N 7/173 (2011.01)
H04N 21/2343 (2011.01)
(Continued)

(52) U.S. Cl.
CPC ........ H04N 21/435 (2013.01); G06F 17/3002 (2013.01); G06F 17/30023 (2013.01); H04L 65/602 (2013.01); H04N 7/17327 (2013.01); H04N 21/235 (2013.01); H04N 21/234309 (2013.01); H04N 21/6125 (2013.01); H04N 21/85406 (2013.01); *H04L 65/4084* (2013.01)

(58) Field of Classification Search
CPC .............. H04L 67/2823; H04L 69/08; H04L 65/4084; H04L 65/102; H04N 21/435; H04N 7/17327; H04N 21/234309; H04N 21/235; H04N 21/6125; H04N 21/85406; G06F 17/3002; G06F 17/30023
USPC .................................... 709/236, 231; 707/10
See application file for complete search history.

(56) References Cited

U.S. PATENT DOCUMENTS 4,509,073 A 4/1985 Baran
5,093,718 A 3/1992 Hoarty
(Continued)

FOREIGN PATENT DOCUMENTS

GB 2369203 A 5/2002
WO 99/07158 2/1999
(Continued)

OTHER PUBLICATIONS

Chou et al. "Multimedia Over IP and Wireless Networks," Pub. Date: 2007, pp. 453-499.*
(Continued)

*Primary Examiner* — Krista Zele
*Assistant Examiner* — James Forman
(74) *Attorney, Agent, or Firm* — Tarolli, Sundheim, Covell & Tummino LLP

(57) ABSTRACT

A method for delivering media content includes receiving a request identifying a requested media file. The method also includes, in response to receiving the request, accessing the requested media file. The requested media file includes media content in a first format. The method further includes generating a modified media file based on the requested media file. The modified media file includes media content in a second format. Additionally, the method includes generating an auxiliary file associated with the modified media file. The auxiliary file includes a plurality of content records associated with different portions of the media content in the modified media file and indicating a location of the associated portion. Each content record includes information to facilitate transmission of the associated portion of the media content to a remote client prior to the modified media file being completely generated.

23 Claims, 4 Drawing Sheets

(51) Int. Cl.
  *H04N 21/235* (2011.01)
  *H04N 21/61* (2011.01)
  *H04N 21/854* (2011.01)
  *H04L 29/06* (2006.01)

(56) References Cited

U.S. PATENT DOCUMENTS

| | | | |
|---|---|---|---|
| 5,220,420 A | 6/1993 | Hoarty | |
| 5,319,455 A | 6/1994 | Hoarty | |
| 5,361,091 A | 11/1994 | Hoarty | |
| 5,412,720 A | 5/1995 | Hoarty | |
| 5,442,700 A | 8/1995 | Snell | |
| 5,485,197 A | 1/1996 | Hoarty | |
| 5,526,034 A | 6/1996 | Hoarty | |
| 5,550,578 A | 8/1996 | Hoarty | |
| 5,557,316 A | 9/1996 | Hoarty | |
| 5,587,734 A | 12/1996 | Lauder | |
| 5,594,507 A | 1/1997 | Hoarty | |
| 5,812,665 A | 9/1998 | Hoarty | |
| 5,822,537 A * | 10/1998 | Katseff et al. | 709/231 |
| 5,883,661 A | 3/1999 | Hoarty | |
| 5,953,506 A | 9/1999 | Kalra | |
| 6,034,678 A | 3/2000 | Hoarty | |
| 6,055,315 A | 4/2000 | Doyle | |
| 6,064,377 A | 5/2000 | Hoarty | |
| 6,100,883 A | 8/2000 | Hoarty | |
| 6,177,931 B1 | 1/2001 | Alexander | |
| 6,205,582 B1 | 3/2001 | Hoarty | |
| 6,253,238 B1 | 6/2001 | Lauder | |
| 6,305,020 B1 | 10/2001 | Hoarty | |
| 6,345,279 B1 | 2/2002 | Li | |
| 6,407,680 B1 | 6/2002 | Lai | |
| 6,421,733 B1 * | 7/2002 | Tso et al. | 709/246 |
| 6,490,627 B1 * | 12/2002 | Kalra et al. | 709/231 |
| 6,498,897 B1 * | 12/2002 | Nelson et al. | 386/125 |
| 6,510,513 B1 | 1/2003 | Danieli | |
| 6,593,860 B2 | 7/2003 | Lai | |
| 6,757,429 B2 | 6/2004 | Hu | |
| 6,823,082 B2 | 11/2004 | Hu | |
| 6,888,477 B2 | 5/2005 | Lai | |
| 6,904,168 B1 | 6/2005 | Steinberg | |
| 6,938,157 B2 | 8/2005 | Kaplan | |
| 6,963,972 B1 * | 11/2005 | Chang et al. | 713/153 |
| 6,970,602 B1 | 11/2005 | Smith | |
| 7,088,823 B2 | 8/2006 | Fetkovich | |
| 7,093,277 B2 | 8/2006 | Perlman | |
| 7,734,800 B2 * | 6/2010 | Gupta et al. | 709/231 |
| 2001/0056460 A1 | 12/2001 | Sahota | |
| 2002/0006204 A1 | 1/2002 | England | |
| 2002/0047899 A1 * | 4/2002 | Son | H04L 12/2801 348/114 |
| 2002/0087957 A1 | 7/2002 | Norris | |
| 2002/0120586 A1 | 8/2002 | Masaki | |
| 2002/0129140 A1 | 9/2002 | Peled | |
| 2002/0131496 A1 * | 9/2002 | Vasudevan et al. | 375/240.11 |
| 2002/0138848 A1 | 9/2002 | Alao | |
| 2002/0172418 A1 | 11/2002 | Hu | |
| 2002/0194227 A1 | 12/2002 | Day | |
| 2003/0004880 A1 | 1/2003 | Banerjee | |
| 2003/0053702 A1 | 3/2003 | Hu | |
| 2003/0061369 A1 * | 3/2003 | Aksu et al. | 709/231 |
| 2003/0105739 A1 | 6/2003 | Essafi | |
| 2003/0158969 A1 | 8/2003 | Gimson | |
| 2003/0185395 A1 | 10/2003 | Lee | |
| 2003/0196206 A1 | 10/2003 | Shusman | |
| 2004/0003117 A1 | 1/2004 | McCoy | |
| 2004/0086039 A1 | 5/2004 | Reynolds | |
| 2004/0111476 A1 | 6/2004 | Trossen | |
| 2004/0133548 A1 | 7/2004 | Fielding | |
| 2004/0133927 A1 | 7/2004 | Sternberg | |
| 2004/0139233 A1 | 7/2004 | Kellerman | |
| 2004/0193648 A1 | 9/2004 | Lai | |
| 2005/0004997 A1 | 1/2005 | Balcisoy | |
| 2005/0060411 A1 * | 3/2005 | Coulombe et al. | 709/227 |
| 2005/0132264 A1 | 6/2005 | Joshi | |
| 2005/0172127 A1 | 8/2005 | Hartung | |
| 2005/0198210 A1 | 9/2005 | Janik | |
| 2005/0213826 A1 | 9/2005 | Neogi | |
| 2005/0265395 A1 | 12/2005 | Kim | |
| 2005/0273598 A1 | 12/2005 | Silverbrook | |
| 2005/0286497 A1 | 12/2005 | Zutaut | |
| 2006/0015649 A1 | 1/2006 | Zutuat | |
| 2006/0026302 A1 | 2/2006 | Bennett | |
| 2006/0117379 A1 | 6/2006 | Bennett | |
| 2006/0136457 A1 | 6/2006 | Park | |
| 2006/0167803 A1 | 7/2006 | Aydar | |
| 2006/0168227 A1 | 7/2006 | Levine | |
| 2006/0168323 A1 | 7/2006 | Kim | |
| 2006/0179472 A1 | 8/2006 | Chang | |
| 2006/0218611 A1 * | 9/2006 | Son et al. | 725/105 |
| 2006/0242318 A1 | 10/2006 | Nettle | |
| 2006/0265657 A1 | 11/2006 | Gilley | |
| 2007/0067390 A1 * | 3/2007 | Agnoli et al. | 709/204 |
| 2007/0067725 A1 | 3/2007 | Cahill | |
| 2007/0124816 A1 | 5/2007 | Abigail | |
| 2007/0162945 A1 | 7/2007 | Mills | |
| 2007/0186005 A1 | 8/2007 | Setlur | |
| 2007/0255659 A1 | 11/2007 | Yen | |
| 2008/0016185 A1 * | 1/2008 | Herberger et al. | 709/219 |
| 2008/0091845 A1 | 4/2008 | Mills | |
| 2008/0114894 A1 | 5/2008 | Deshpande | |
| 2008/0141303 A1 | 6/2008 | Walker | |
| 2008/0195698 A1 * | 8/2008 | Stefanovic et al. | 709/203 |
| 2008/0195761 A1 | 8/2008 | Jabri | |
| 2008/0231480 A1 | 9/2008 | Lai | |
| 2008/0235200 A1 | 9/2008 | Washington | |
| 2009/0013414 A1 | 1/2009 | Washington | |
| 2009/0024626 A1 * | 1/2009 | Takei | 707/9 |
| 2009/0083279 A1 * | 3/2009 | Hasek | 707/10 |
| 2009/0119322 A1 * | 5/2009 | Mills et al. | 707/101 |
| 2009/0164601 A1 | 6/2009 | Swartz | |
| 2009/0232220 A1 | 9/2009 | Neff | |
| 2010/0027765 A1 * | 2/2010 | Schultz et al. | 379/52 |
| 2010/0094931 A1 | 4/2010 | Hosur | |
| 2010/0185776 A1 | 7/2010 | Hosur | |

FOREIGN PATENT DOCUMENTS

| | | |
|---|---|---|
| WO | 02/082271 | 10/2002 |
| WO | 03/032136 | 4/2003 |
| WO | 03/073370 | 9/2003 |
| WO | WO 2004/077790 A1 | 9/2004 |
| WO | 2005/006768 | 1/2005 |
| WO | WO 2005/046140 A1 | 5/2005 |
| WO | 2006/134310 | 12/2006 |
| WO | 2007/053957 | 5/2007 |
| WO | 2007/063485 | 6/2007 |
| WO | WO 2009/024926 A1 | 2/2009 |

OTHER PUBLICATIONS

PCT Notification of Transmittal of the International Search Report and the Written Opinion of the International Searching Authority, or the Declaration with attached PCT International Search Report and the Written Opinion of the International Searching Authority in International Application No. PCT/US2009/056310, dated Nov. 17, 2009, 12 pages.

U.S. Appl. No. 12/578,773, Office Action dated Dec. 13, 2010, Hosur.

U.S. Appl. No. 11/772,582, Office Action dated Dec. 21, 2010, Washington.

U.S. Appl. No. 11/772,582, Office Action dated Jun. 28, 2010, Washington.

U.S. Appl. No. 11/688,936, Office Action dated Aug. 7, 2009, Washington.

U.S. Appl. No. 11/328,587, Office Action dated Dec. 10, 2010, Mills.

U.S. Appl. No. 11/328,587, Office Action dated Jul. 8, 2010, Mills.

U.S. Appl. No. 11/328,587, Office Action dated Apr. 16, 2009, Mills.

U.S. Appl. No. 11/328,587, Office Action dated Sep. 19, 2008, Mills.

(56) References Cited

OTHER PUBLICATIONS

U.S. Appl. No. 11/549,226, Office Action dated Sep. 30, 2010, Mills.
U.S. Appl. No. 11/549,226, Office Action dated Mar. 1, 2010, Mills.
U.S. Appl. No. 11/549,226, Office Action dated Aug. 3, 2009, Mills.
U.S. Appl. No. 11/549,226, Office Action dated Oct. 13, 2006, Mills.
U.S. Appl. No. 11/936,548, Office Action dated Nov. 7, 2008, Mills.
U.S. Appl. No. 11/936,548, Office Action dated Jan. 5, 2010, Mills.
"Akimbo adds RSS feeds to video-on-demand service," Online Reporter, No. 455, Aug. 6, 2005.
APEC eSecurity Task Group, "Guidelines to Issue Certificates Capable of Being Used in Cross Jurisdictional eCommerce," *APEC*, Dec. 2004.
Bezoza, Alan et al., "How the Internet Will Disrupt the Long-Term Video Value Chain," Friedman, Billings, Ramsey & Co., Inc., Oct. 6, 2005.
Färber, Nikolaus et al., "Adaptive progressive download based on the MPEG-4 file format," *Journal of Zhejiang University Science* A (Suppl I), 2006.
Kantarci, Aylin et al.; "Rate adaptive video streaming under lousy network conditions;" *Signal Processing: Image Communication 19*, Mar. 22, 2004.
PCT Notification of Transmittal of the International Search Report and the Written Opinion of the International Searching Authority , or the Declaration with attached PCT International Search Report and the Written Opinion of the International Searching Authority in International Application No. PCT/US2008/055079, Sep. 4, 2008.
PCT Notification of Transmittal of the International Search Report and the Written Opinion of the International Searching Authority, or the Declaration with attached International Search Report and the Written Opinion of the International Searching Authority in International Application No. PCT/US2009/060590, Jan. 22, 2010.
PCT Notification of Transmittal of the International Search Report and the Written Opinion of the International Searching Authority , or the Declaration with attached PCT International Search Report and the Written Opinion of the International Searching Authority in International Application No. PCT/US2010/021474, Apr. 26, 2010.
Schierl, Thomas et al.; "Mobile Video Transmission Using Scalable Video Coding;" *IEEE Transactions on circuits and Systems for Video Technology*; 17:9; pp. 1204-1217, Sep. 2007.
Singer et al., "ISO Media File format specification," *International Organisation for Standardisation ISO/IEC* 14496-1:2001/Amd. 3, Oct. 31, 2008.
Xin , Jun et al., "Digital Video Transcoding," *Proceedings of the IEEE*, 93:1, pp. 84-97, Jan. 2005.
Office Action for U.S. Appl. No. 12/578,773, Jun. 28, 2011.
Office Action for U.S. Appl. No. 11/328,587, Apr. 29, 2011.
Office Action for U.S. Appl. No. 11/549,226, Apr. 20, 2011.
Office Action for U.S. Appl. No. 12/690,166, Mar. 24, 2011.
Hosur, Request for Continued Examination Transmittal and Amendment Filed with Request for Continued Examination for U.S. Appl. No. 12/578,773, Dec. 6, 2012.
Hosur, Response to Nonfinal Office Action for U.S. Appl. No. 12/578,773, Apr. 13, 2011.
Hosur, Request for Continued Examination Transmittal and Amendment Filed with Request for Continued Examination for U.S. Appl. No. 12/578,773, Nov. 2, 2011.
Hosur, Response to Nonfinal Office Action for U.S. Appl. No. 12/578,773, Mar. 28, 2012.
USPTO, Final Office Action for U.S. Appl. No. 12/578,773, Aug. 6, 2012.
USPTO, Nonfinal Office Action for U.S. Appl. No. 12/690,166, Dec. 21, 2010.
Hosur, Response to Nonfinal Office Action for U.S. Appl. No. 12/690,166, Dec. 30, 2010.
Hosur, Response to Nonfinal Office Action for U.S. Appl. No. 12/690,166, Jul. 25, 2011.
Hosur, Request for Continued Examination Transmittal and Amendment Filed with Request for Continued Examination for U.S. Appl. No. 12/690,166, Nov. 23, 2011.
Office Action for U.S. Appl. No. 11/772,582, Aug. 29, 2011.
Office Action for U.S. Appl. No. 12/690,166, Sep. 29, 2011.
Office Action for U.S. Appl. No. 11/328,587, Oct. 26, 2011.
Office Action for U.S. Appl. No. 12/578,773, Nov. 28, 2011.
Office Action of State Intellectual Property Office of the People's Republic of China for Application No. 100980144939.2, Feb. 25, 2013.

\* cited by examiner

SYSTEM AND METHOD FOR DELIVERING CONTENT

TECHNICAL FIELD

This invention relates, in general, to media-content delivery systems and, more particularly, to a system and method for delivering media content.

BACKGROUND OF THE INVENTION

The variety and availability of audio, video, and multimedia content has increased significantly in the recent past. Internet, mobile Internet, cell phones, personal data assistants, and other mobile media devices fuel constant development and increased demand for media content delivery in a variety of formats. Furthermore, the rapid growth in user-generated content has created a large supply of media content available to users in a large number of disparate formats.

Converting content from a source format provided by a content source to a different target format supported by a particular media player can be time-consuming and computationally-intense. Moreover, the wide variety of source and target formats available can result in slow content-delivery, create congestion in content-processing components, and require ever increasing storage capabilities. Additionally, delays in content processing may degrade the user experience.

SUMMARY OF EXAMPLE EMBODIMENTS

In accordance with the present invention, disadvantages and problems associated with managing media content have been substantially reduced or eliminated.

In accordance with one embodiment of the present invention, a method for delivering media content includes receiving a request identifying a requested media file. The method also includes, in response to receiving the request, accessing the requested media file. The requested media file includes media content in a first format. The method further includes generating a modified media file based on the requested media file. The modified media file includes media content in a second format. Additionally, the method includes generating an auxiliary file associated with the modified media file. The auxiliary file includes a plurality of content records associated with different portions of the media content in the modified media file and indicating a location of the associated portion.

In accordance with another embodiment of the present invention, a method for delivering media content includes receiving a media file that includes media content and accessing an auxiliary file associated with the received media file. The auxiliary file includes a plurality of content records, and each content record is associated with a particular portion of the media content. The method further includes determining the location of a first portion of the media content within the modified media file based on the content record associated with the first portion of the media content and transmitting the first portion of the media content to a remote client.

Technical advantages of certain embodiments include the ability to provide media content to devices in various formats. Certain embodiments teach a content-transmission system and method that provides low-latency delivery of content to remote clients. Additionally, particular embodiments may significantly increase content available to media players while decreasing the time necessary to deliver the content. Certain embodiments overcome problems associated with rapid delivery of media files in particular formats, and may increase efficient use of transcoding and streaming resources, as well as provide low-latency transcoding, transrating, streaming, delivery, and/or other modifications of media content in various formats. Additionally, particular embodiments may reduce system complexity. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION

Figure 1:
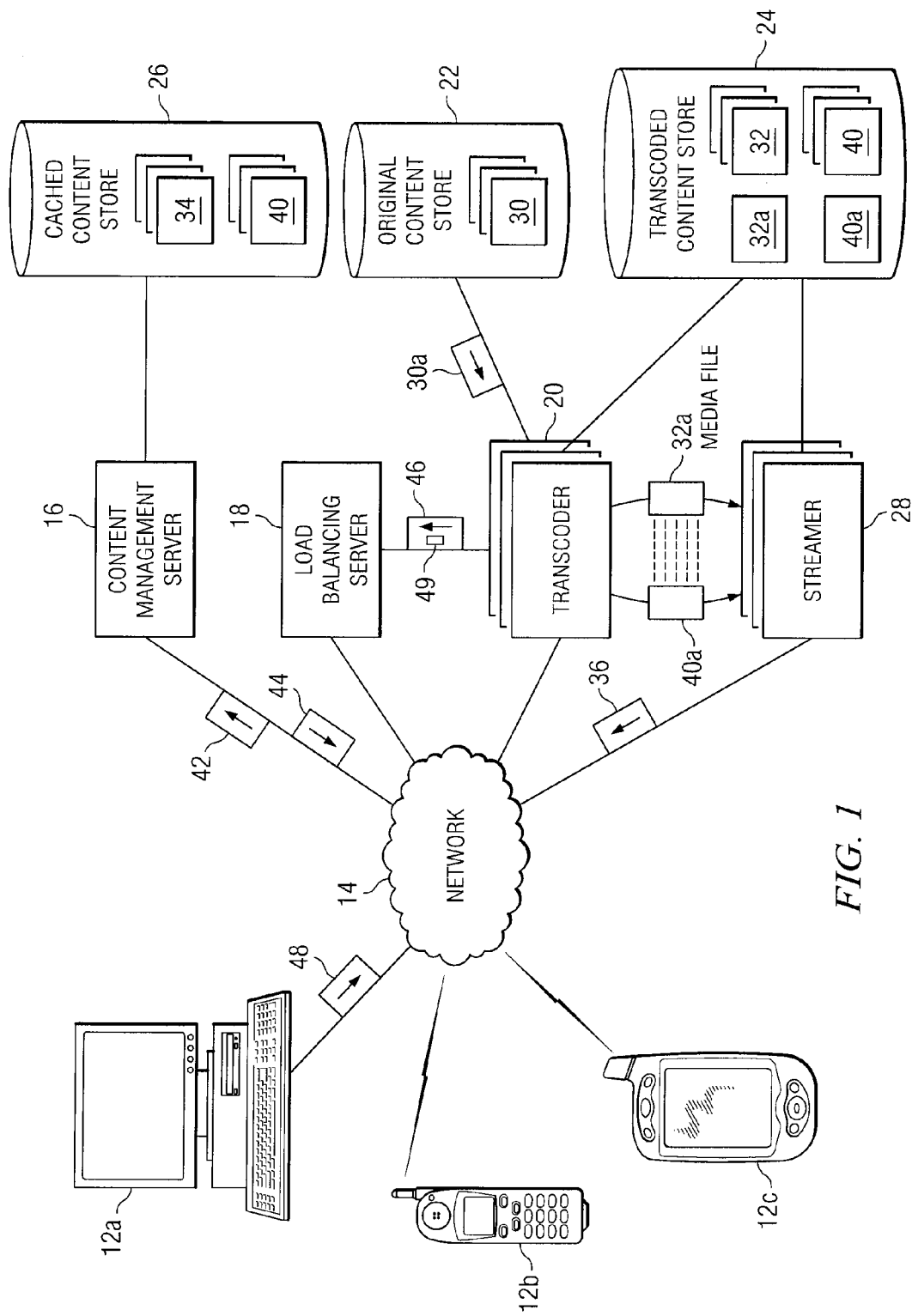
FIG. 1 illustrates a system for managing media content according to particular embodiments.

FIG. 1 illustrates a particular embodiment of a system 10 for transmitting content from media files stored in original content store 22 to clients 12. System 10 includes clients 12a-c, network 14, content management server (CMS) 16, load balancing server (LBS) 18, one or more transcoders 20, original content store 22, transcoded content store 24, cached content store 26, and one or more streamers 28. To provide content to clients 12 having a variety of different reception and display requirements, system 10 may modify content in original content store 22 to make the content suitable for transmission to and/or display by a particular client 12. By initiating the transmission or delivery of modified content from a particular media file to a requesting client 12 before the entire media file has been modified, system 10 may reduce the latency associated with processing content for delivery to a diverse range of clients 12.

In general, within particular embodiments of system 10, clients 12 communicate with CMS 16 through network 14 for purposes of requesting content. CMS 16 connects to cached content store 26 and manages access to cached content store 26. Additionally, CMS 16 is coupled to load balancing server (LBS) 18, which receives and fulfills transcoding requests 44 sent by CMS 16. LBS 18 is coupled to one or more transcoders 20 and streamers 28 and manages the operation of the associated transcoders 20 and streamers 28. Transcoders 20 are capable of retrieving source media files 30 from original content store 22 and modifying the retrieved source media files 30 so that content from source media files 30 can be transmitted to and displayed by a particular client 12. Transcoders 20 are additionally coupled to one or more streamers 28, which operate to stream or transmit content to clients 12. Thus, as a result of the operation of these components, system 10 may, in particular embodiments, be capable of supporting on-demand content provision in a variety of formats for a wide range of different clients.

Content in system 10 is stored in various media files, including source media files 30, transcoded media files 32, and cached media files 34. These media files may comprise any suitable form of voice, non-voice audio, animation, and/or video information or data that may be played, displayed or otherwise communicated by clients 12 to users of clients 12. As discussed further below, the content available on system 10 may, in particular embodiments, have a variety of different characteristics that may determine the types of clients 12 that can utilize the content of the various media files. For example, media files may be associated with different codecs, bit-rates, resolutions, and/or other characteristics that may effect which clients 12 can utilize the various media files.

Clients 12 display, play, or otherwise communicate content retrieved from original content store 22, transcoded content store 24, and/or from cached content store 26 to users. Clients 12 may represent any type of device appropriate to play one or more type of media content utilized in system 10. Examples of clients 12 may include, but are not limited to, computers, video-enabled telephones, media players (such as, for example, audio- and/or video-capable iPods), televisions, PDAs, cell phones, portable communication devices, and other electronic devices. In general, however, clients 12 may include any appropriate combination of hardware, software, and/or encoded logic suitable to provide the described functionality. Clients 12 may couple to network 14 through a dedicated connection (wired or wireless) or may connect to network 14 only as needed to access media content. For example, clients 12, such as portable media players, may connect temporarily to network 14 to download content from source media files 30 but then disconnect before displaying content from the source media files 30. Although FIG. 1 illustrates, for purposes of example, a particular number and type of clients 12, alternative embodiments of system 10 may include any appropriate number and type of clients 12.

In particular embodiments, various clients 12 may be capable of receiving and/or playing media associated with particular file formats, file types, codecs, bit-rates, and/or resolutions, and/or having other appropriate characteristics. For example, in the illustrated embodiment, client 12a may comprise a computer which utilizes a different media file format than a video-enabled cellphone, represented as client 12b, or a portable communication device, represented as client 12c. Consequently, as described further below, system 10 may modify requested content to match the capabilities of the specific requesting client 12.

Network 14 represents any form of communication network supporting circuit-switched, packet-based, and/or any other suitable type of communication. Although shown in FIG. 1 as a single element, communication network may represent one or more separate networks, including all or parts of various different networks that are separated and serve different groups of clients 12. Network 14 may include routers, hubs, switches, gateways, call controllers, and/or any other suitable components in any suitable form or arrangement. In general, network 14 may comprise any combination of public or private communication equipment such as elements of the public-switched telephone network (PSTN), a global computer network such as the Internet, a local area network (LAN), a wide-area network (WAN), or other appropriate communication equipment.

Additionally, although FIG. 1 illustrates a particular configuration of elements directly connected to network 14, network 14 may, in particular embodiments, connect directly or indirectly to and/or interact with any appropriate elements of system 10. For example, although FIG. 1 shows transcoders 20 directly connected to original content store 22 and streamers 28, transcoders 20 may, alternatively connect to either or both of original content store 22 and streamers 28 over network 14. Likewise, although in FIG. 1 CMS 16 communicates with LBS 18 over network 14, in particular embodiments, CMS 16 may be directly connected to LBS 18. Accordingly, the components of system 10 may be arranged and configured in any appropriate manner to communicate over network 14 and/or over direct connections between the relevant components.

CMS 16 processes requests from clients 12 to download, retrieve, stream, view, or otherwise receive content from source media files 30. In particular embodiments, CMS 16 may also be responsible for initiating transcoding and streaming, or otherwise managing the operation of transcoders 20 and streamers 28 in delivering content to clients 12. CMS 16 may additionally authenticate users, execute content search requests, or otherwise facilitate interaction between users and the content-provision services offered by system 10.

Additionally, in particular embodiments, CMS 16 may allow clients 12 to browse or search for source media files 30 and/or preview content from source media files 30 available from system 10. For example, in particular embodiments, CMS 16 may host a web page that displays content available on system 10 and allows a user of a particular client 12 to specify or describe a source media file 30 requested by the user. Thus, in such embodiments, clients 12 may access the web page and request a download of content from selected source media files 30. CMS 16 may then initiate appropriate operations to deliver content from the source media file 30 to client 12.

Although shown in FIG. 1 as a single component, in particular embodiments, CMS 16 may represent functionality provided by several separate physical components. More generally, CMS 16 may represent any appropriate combination of software and/or hardware suitable to provide the described functionality. As one specific example, in particular embodiments, CMS 16 may represent a web server configured to receive and respond to Hypertext Transfer Protocol (HTTP) requests from clients 12.

LBS 18 receives transcoding requests 44 from CMS 16 and selects an appropriate transcoder 20 to modify or format requested content. LBS 18 may also, in certain embodiments, select an appropriate streamer 28 to stream, send, or otherwise forward requested content to client 12. LBS 18 may additionally notify CMS 16 and/or clients 12 that the modification of requested content has begun and identify the transcoder 20 and/or streamer 28 responsible for satisfying the request to the relevant components of system 10. LBS 18 may include any appropriate combination of software and/or hardware suitable to provide the described functionality.

Transcoders 20 retrieve, receive, or otherwise access requested content from original content store 22 and modify requested content in a manner suitable for transmission to and display by the requesting client 12. Depending on the capabilities of the requesting client 12 and the characteristics of the requested source media file 30, transcoders 20 may transcode, transrate, adjust the resolution of, and/or modify content from the requested source media file 30 and/or appropriate characteristics of the source media file 30 in any appropriate manner to make the content suitable for transmission to and/or playback by the requesting client 12. Transcoders 20 may also be capable of sending, forwarding, sharing, or otherwise transmitting modified content to one or more streamers 28. In particular embodiments, transcoders 20 may be capable of transcoding content at realtime.

Transcoders 20 may be capable of modifying content in source media files 30 to facilitate transmission to and/or playback by clients 12. As part of modifying content, transcoders 20 may modify the content of a requested source media file 30 from a first format, such as an original format in which the relevant source media file 30 is stored, to a second format, such as a target format appropriate for transmission to and display by a requesting client 12. For purposes of this description and the claims that follow, the "format" of content refers to an encoding, bit-rate, resolution, frame rate, configuration, and/or any other aspect, characteristic, or property of the relevant content that is associated with transmitting the content to or displaying the content with a particular type of client.

Additionally, as described further below, transcoders 20 may also generate auxiliary files 40 that include certain information to allow streamers 28 to stream transcoded content from source media files 30 to clients 12 before the relevant transcoder 28 has completed transcoding the entire source media file 30. As described further below, auxiliary files 40 may include any suitable form of data, code, or information that may be used by one or more streamers 28 to deliver transcoded content from a requested source media file 30 while transcoding is ongoing.

Streamers 28 retrieve, receive, or otherwise access modified content from transcoders 20 to deliver, stream, or otherwise transmit transcoded content to clients 12. Depending on the relevant configuration of system 10, streamers 28 and transcoders 20 may comprise a single component, or may alternatively comprise separate components. In certain embodiments, streamers 28 receive auxiliary files 40 from transcoders 20 to facilitate proper transmission of content from transcoded media files 32 to client 12. Streamers 28 may, in particular embodiments, utilize auxiliary file 40 to transmit transcoded or modified content from a requested source media file 30 to one or more requesting clients 12 before transcoder 20 completes transcoding of the entire file, thereby reducing the delay between the client's request for the source media file 30 and delivery of appropriately formatted content to the requesting client 12. Streamers 28 and transcoders 20 may include any appropriate combination of software and/or hardware suitable to provide the described functionality. The contents of particular embodiments of transcoder 20 and streamer 28 are described in greater detail below with respect to FIGS. 3 and 4.

Although FIG. 1 and the description below describe a particular embodiment of system 10 in which the functionality of system 10 is divided among the various components in a particular manner, in alternative embodiments, the described functionality of system 10 may be divided between CMS 16, LBS 18, transcoders 20, streamers 28, and/or other appropriate components of system 10 in any suitable manner. Additionally, CMS 16, LBS 18, transcoders 20, and/or streamers 28 may each comprise separate components of system 10, or may alternatively be combined in any manner as appropriate for performing the described functions. For example, in certain embodiments, CMS 16 and LBS 18 may comprise a single component of system 10.

Furthermore, CMS 16, LBS 18, transcoders 20, streamers 28, and/or other appropriate portions of system 10 may all be operated by the same entity or by any number of different entities. As one example, in particular embodiments, CMS 16 may be operated by a wireless telecommunications provider that outsources transcoding responsibilities to the operator of transcoders 20. As another example, in particular embodiments, CMS 16 may be operated by the operator of a peer-to-peer content-sharing website, such as YouTube, or a social networking website, such as MySpace. More generally, however, the components of system 10 may be controlled or operated by any appropriate combination of entities.

Original content store 22, transcoded content store 24, and cached content store 26 may each represent or include any appropriate type of memory devices. These content stores may comprise, for example, any collection and arrangement of volatile or non-volatile, local or remote devices suitable for storing data, such as random access memory (RAM) devices, read only memory (ROM) devices, magnetic storage devices, optical storage devices, or any other suitable data storage devices. Additionally, although each are shown as a single element in system 10, these content stores may each represent a plurality of devices and may be distributed across multiple locations within system 10. For example, in particular embodiments, one or more of these content stores may represent a network-attached storage (NAS) or portion thereof.

Original content store 22 stores source media files 30 for delivery to clients 12. As noted above, source media files 30 may comprise any appropriate type of content files. Specific examples of source media files 30 include video/multimedia content files such as Moving Picture Experts Group (MPEG), Windows Media Video (WMV), Audio Video Interleave (AVI), and QuickTime files; audio content files such as Waveform audio (WAV), MPEG-1 Audio Layer 3 (MP3), and/or Windows Media Audio (WMA) files; and/or content files of any other appropriate type or format. In particular embodiments, the source media files 30 in original content store 22 may all be stored in a single storage format supported by system 10. Alternatively, original content store 22 may store source media files 30 having a variety of different formats. Original content store 22 may store source media files 30 appropriate for transmission or display by a variety of different clients 12. Although shown in FIG. 1 as part of system 10, original content store 22 may represent components external to system 10, such as memory components distributed throughout the Internet. As a result, in particular embodiments, transcoders 20 may be able to retrieve, receive, otherwise access and/or process source media files 30 provided by a vast number of content sources available throughout the Internet for delivery to clients 12.

Transcoded content store 24 stores transcoded media files 32 representing content from source media files 30 that has been generated, transcoded, or otherwise modified by transcoders 20. In certain embodiments, transcoders 20 may store transcoded media files 32 that contain modified content from a particular source media file 30 in transcoded content store 24 while transcoders 20 continue modifying the relevant source media file 30. Transcoded media files 32 may comprise media content of any appropriate type or format including, but not limited to, those listed above for source media files 30. In particular embodiments, transcoded media files 32 may be of types or formats (such as 3GP files) that are not conducive to streaming, using traditional streaming techniques, until transcoders 20 have finished writing to the relevant transcoded media files 32. Additionally, although referred to here as "files," in certain embodiments, a transcoded media file 32 stored in transcoded content store 24 may, at a given point in time, represent a partial file that is not complete according to a type or format associated with the relevant transcoded media file 32 or the content it contains.

Transcoded content store 24 may also store auxiliary files 40 generated by transcoders 20 during the process of transcoding media files 30 in transcoded content store 24. As discussed further below, auxiliary files 40 may be used to facilitate streaming of transcoded media files 32 or cached media files 34 under certain circumstances. In particular embodiments, transcoded content store 24 represents storage local or internal to transcoders 20, such as the internal memory of a web server functioning as one of transcoders 20.

Cached content store 26 stores cached media files 34 for delivery to clients 12. As discussed above, cached media files 34 may comprise media content of any appropriate type or format including, but not limited to, those listed above for source media files 30. Cached media files 34 may, in certain embodiments, represent transcoded media files 32 that are stored in cached content store 26 after being created by transcoders 20. Depending on the configuration of system 10, cached content store 26 may also store auxiliary files 40 associated with the relevant transcoded media files 32.

Additionally, in particular embodiments, cached content store 26 stores cached media files 34 in a commonly-requested format to minimize the frequency with which transcoding of source media files 30 is performed. As a result, CMS 16 may determine whether the content of a particular source media file 30 requested by client 12 is stored in cached content store 26 in an appropriate format before requesting the relevant source media file 30 from LBS 18, transcoders 20, and/or streamers 28. Moreover, in certain embodiments, CMS 16 may instruct or otherwise communicate with a streamer 28 to deliver cached media files 34 directly from cached content store 26 to clients 12 capable of receiving and displaying content in the storage content format. As a result, in such embodiments, system 10 may deliver content, when appropriate, from cached content store 26 to clients 12 without any transcoding, transrating, or other modification. For example, if a particular video file is frequently requested by clients 12 in 3GP format, but rarely requested in QuickTime video format, system 10 may store the video file in cached content store 26 in 3GP format but not QuickTime format for efficient use of storage and transcoding resources.

In operation, CMS 16 initiates the retrieval of media content requested by clients 12. As part of this process, source media files 30 may be transcoded or otherwise modified by transcoders 20 to provide content suitable for transmission to and/or display by the requesting client 12. Transcoders 20 additionally generate an auxiliary file 40 associated with the transcoded media file 32. Streamers 28 may reduce the latency associated with transmission by utilizing auxiliary file 40 to transmit transcoded content from a transcoded media file 32 to client 12 before the entirety of the requested source media file 30 is transcoded.

FIG. 1 illustrates an example of this process implemented by system 10. As shown by FIG. 1, a client 12 (here, client 12a) may initiate the delivery process by transmitting a content request 42 to CMS 16. Content request 42 may identify a specific source media file 30 or may describe characteristics (using, for example, keywords) of the requested media content. Content request 42 may represent any appropriate message, request, or appropriately-structured collection of information requesting delivery of content by the transmitting client 12. For example, in particular embodiments, content request 42 represents a Hypertext Transfer Protocol (HTTP) request that identifies a particular source media file 30 stored by original content store 22.

In response to receiving content request 42, CMS 16 may, in particular embodiments, determine an appropriate format (referred to here as the "target format") for the requested content to allow, facilitate, and/or optimize transmission to and playback by the requesting client 12. CMS 16 may determine the target format based on any appropriate information, considerations, or and/or circumstances. As one example, content request 42 may indicate the appropriate format that the requested content should have for transmission to and/or playback by the requesting client 12. Thus, in particular embodiments, CMS 16 may receive an HTTP request specifying the codec, bit-rate, and/or other parameters for the requested content. As a result, CMS 16 may be able to determine, based on information contained in the HTTP request, the output format and characteristics appropriate for the requested content. As another example, CMS 16 may identify the requesting client 12 and/or relevant characteristics of the requesting client 12 and determine a target format for the requested content based on this information. For example, CMS 16 may identify whether the client is a computer 12a, cellular phone 12b, or personal data assistant 12c, and/or other type of client device. In response, CMS 16 may determine the format characteristics appropriate for the particular client 12a-c based on its type. As yet another example, CMS 16 may detect characteristics of the particular network or portion of network 14 that the requesting client 12 is communicating over to determine an appropriate target format in which to provide the requested content to the requesting client 12. Thus, in particular embodiments, CMS 16 may determine, based on the fact that content request 42 was received over a certain type of network, an appropriate codec or bit-rate at which to transmit the requested content to the requesting client 12. In general, however, CMS 16 may determine, in any suitable manner and based on input from any appropriate components, the proper format and characteristics for the content requested by the requesting client 12.

In particular embodiments, system 10 may include cached content store 26 in which cached media files 34 may be stored in certain formats (e.g., after being transcoded by transcoders 20 in response to a previous content request 42). As a result, in such embodiments, CMS 16 may determine whether content from the requested source media file 30 is already stored in cached content store 26 in the target format. If cached content store 26 contains a cached media file 34 containing the requested content in the target format, CMS 16 may instruct a streamer 28 to retrieve the relevant cached media file 34 and transmit the relevant cached media file 34 to the requesting client 12.

If, however, cached content store 26 does not contain a cached media file 34 containing the requested content in the target format (or if system 10 does not include any cached content store 26), CMS 16 may initiate transcoding of a source media file 30 containing the requested content. To initiate transcoding and/or transmission of the requested content, CMS 16 may transmit a transcoding request 44 to a transcoder 20 and/or streamer 28 or, in embodiments that include LBS 18, to LBS 18. Transcoding request 44 may represent any appropriate message, request, or suitably-structured collection of information requesting modification and/or streaming of particular content. For example, in particular embodiments, transcoding request 44 represents an HTTP request that identifies a particular source media file 30 containing content to be transcoded and/or transmitted to a client 12, and an appropriate output format for the requested content.

In embodiments of system 10 that include LBS 18, LBS 18 receives a transcoding request 44 and, in response, selects a transcoder 20 to modify the requested content based on the target format. LBS 18 may additionally select a streamer 28 to transmit or stream the requested content to the requesting client 12 in the target format. In various embodiments, LBS 18 may select a transcoder 20 and/or streamer 28 based on process loads, queues, and other availability indicators associated with transcoders 20 and/or streamers 28. LBS 18 may then forward transcoding request 44 to the selected transcoder 20 and/or streamer 28 requesting modification and/or transmission of requested content according to the target format.

A particular transcoder 20 and/or streamer 28 then receives transcoding request 44 from CMS 16 or LBS 18. In response to receiving transcoding request 44, the transcoder 20 locates and retrieves the requested source media file 30 (referred to here as "requested source media file 30a") from original content store 22. Transcoder 20 may retrieve, receive, or otherwise access requested source media file 30a in any appropriate manner. In particular embodiments, original content store 22 includes one or more web servers (and associated memory elements) accessible through the Internet and the relevant transcoder 20 may communicate with original content store 22 using the HTTP protocol.

Transcoder 20 then modifies requested source media file 30a according to a target format. As noted above, transcoder 20 may modify requested source media file 30a by transcoding, transrating, changing the resolution of, and/or otherwise modifying any aspect, characteristic, or property of the content in requested source media file 30a. While modifying requested source media file 30a, transcoder 20 stores portions of the modified content from requested source media file 30a (referred to, in this example, as "transcoded media file 32a") in transcoded content store 24.

Problems may arise in low-latency transmission, however, where a target format is not conducive to transmission or streaming until a requested source media file 30 is completely transcoded. For example, certain file formats may require data blocks, headers, or other file information which is not written until file transcoding is complete, but is needed to properly transmit, display, view, and/or otherwise use the requested content at client 12. As one example, 3GP files include a structure called a "moov" box that contains information about the content stored in the 3GP file, such as the starting point of the content in the 3GP file, the type of content stored in the file, and the sequence in which the content should be played. The information contained in the "moov" box of a 3GP file is written progressively and is, thus, incomplete while a media file is being written to the 3GP format. Accordingly, for 3GP files, this "moov" information is not complete until the entire 3GP file is written and all 3GP audio and video data is available. As a result, the use of 3GP files may hinder or prevent certain conventional systems from streaming content from a 3GP file that a transcoder is still transcoding. Similar or comparable problems may arise with respect to other media file formats as well.

Thus, to facilitate streaming of portions of transcoded media file 32a while transcoder 20 is still writing to transcoded media file 32a, transcoder 20 may additionally generate an auxiliary file 40 (referred to in this example as "auxiliary file 40a"). Auxiliary file 40a may include any suitable form of data, code, or information that may be used by one or more streamers 28 to deliver portions of the content in a requested source media file 30 while transcoding is ongoing. For example, in certain embodiments, auxiliary file 40a may include a plurality of records associated with particular portions of the media content in a transcoded media file 32a. Such content records may indicate a location of the associated portion of media content within the transcoded media file 32a. Some embodiments may contain information regarding where within transcoded media file 32a a streamer 28 may locate particular audio and video data. In such embodiments, streamer 28 may use this information to identify a particular location within a portion of transcoded media file 32a, read a specified amount of information (e.g., a particular number of bytes) as directed by auxiliary file 40a, and accordingly send a portion of modified content from transcoded media file 32a to client 12 before transcoder 20 completes the modification of requested source media file 30a. Additionally or alternatively, auxiliary file 40a may include file header information for transcoded media file 32a, location data for frames or other portions of transcoded media file 32a, audio and/or video data such as timestamp data, framerate data, resolution data, bitrate data, and any other appropriate information. The structure and content of an example auxiliary file 40 is discussed more fully below with reference to FIG. 2.

In certain embodiments, while a transcoder 20 is transcoding requested source media file 30a, the same or another transcoder 20 may simultaneously generate auxiliary file 40a containing information regarding modified content in transcoded media file 32a. Auxiliary file 40a may be accessed by a selected streamer 28 and used by that streamer 28 to transmit all or portions of transcoded media file 32a to client 12 while transcoding is ongoing. Accordingly, streamer 28 may utilize information in auxiliary file 40a to transmit content from requested source media file 30a to a client 12 even though requested source media file 30a and/or the content it contains has a format that is not conducive to being streamed, using traditional streaming techniques, until the entire content of requested source media file 30a is transcoded.

Transcoder 20 may generate auxiliary file 40a and make the information in auxiliary file 40a accessible to the relevant streamer or streamers 28 in any appropriate manner. In certain embodiments, transcoder 20 may generate a partial auxiliary file 40a in transcoded content store 24 containing information about a first portion of transcoded media file 32a and continue writing information to this partial auxiliary file 40a as transcoding continues. The relevant streamer or streamers 28 may then access the partial auxiliary file 40a incrementally to allow streaming of content from transcoded media file 32a while transcoded media file 32a and auxiliary file 40a are still being written. In certain embodiments, the salient information in auxiliary file 40a may be generated during the course of transcoding. Accordingly, auxiliary file data may be a by-product of the transcoding process and thus transcoder 20 may be able to generate auxiliary file 40a without generating any additional information beyond that otherwise generated in the transcoding process.

Before or during modification of the content in requested source media file 30a, transcoder 20 may notify a selected streamer 28 that transcoding has begun. Additionally, transcoder 20 or, if notified by transcoder 20, streamer 28 may transmit information to the requesting client 12 indicating that the requested content may be retrieved in the target format. For example, in particular embodiments transcoder 20 notifies a selected streamer 28 that transcoding of requested source media file 30a has begun, and streamer 28 sends a content response 46 to CMS 16 indicating a first portion of requested source media file 30a has been (or will be) modified according to the target format and is available (or will soon be available) for delivery to client 12. Content response 46 may be sent from transcoder 20 and/or streamer 28 to CMS 16 directly over network 14, or by first passing through LBS 18. CMS 16 may then communicate content response 46 to the requesting client 12, e.g., as an HTTP response.

In particular embodiments, content response 46 may include a streamer identifier 49 that represents an address, location, or other identifier for the relevant streamer 28 that the requesting client 12 may use to retrieve the modified content. For example, in particular embodiments, streamer identifier may represent a Real Time Streaming Protocol (RTSP) uniform resource locater (URL) address. As a result, in particular embodiments, streamer 28 may transmit an HTTP response to CMS 16 that includes a URL address that the requesting client 12 can use to communicate with streamer 28.

Client 12 may then request the transcoded content from streamer 28. For example, the requesting client 12 may transmit a transmit request 48 to the relevant streamer 28 requesting transmission of content from transcoded media file 32a to the requesting client 12. In particular embodiments, clients 12 communicate with streamer over network 14 using streamer identifier 49 communicated as part of content response 46 to initiate transmission of requested content in the target format. The transmitted portions are shown in FIG. 1 as streamed media content 36. Alternatively, in particular embodiments, the selected streamers 28 may be provided an address, identifier, or other information identifying the requesting client 12, and the selected streamer 28 may itself initiate transmission of the transcoded content to the requesting client 12 without receiving any request from the relevant client 12.

After transcoder 20 has begun transcoding requested source media file 30a and the selected streamer 28 has received any appropriate requests, the selected streamer 28 may begin transmitting streamed media content 36 to the requesting client 12 in the appropriate target format. Although referred, for purposes of illustration, as "streamed" media content, streamer 28 may transmit streamed media content 36 to client 12 as a media stream, progressive download, or in any other appropriate manner. Additionally, in particular embodiments, streamer 28 may begin transmitting streamed media content 36 to client 12 while the selected transcoder 20 is still modifying the content of requested source media file 30a. Thus, the content flow through transcoder 20 and streamer 28 represented in FIG. 1 by 30a, 32a, and 36 may be concurrently ongoing.

To facilitate transmission of streamed media content 36 from transcoded media file 32a while transcoder 20 is still writing content to transcoded media file 32a, streamer 28 may utilize information in auxiliary file 40a to access and/or transmit streamed media content 36 to the requesting client 12. As one example, in certain embodiments, auxiliary file 40a may include one or more records storing location and/or size information associated with separate portions (e.g., individual video frames) of the modified media content in transcoded media file 32a. Streamer 28 receives or otherwise accesses a first record in auxiliary file 40a while transcoding is ongoing and, using information in this first record, determines a location for a corresponding first portion of media content stored in transcoded media file 32a. Streamer 28 may then use this location information to access the corresponding first media portion and transmit this first media portion to client 12.

Furthermore, streamer 28 may repeat this process for additional records in auxiliary file 40a and, thus, may access and transmit portions of transcoded media file 32a associated with each record of auxiliary file 40a. For example, in an embodiment of system 10 delivering video content, streamer 28 may increment a pointer associated with transcoded media file 32a based on a frame size associated with transcoded media file 32a, retrieve a particular video frame from a location determined based on the pointer by reading a number of bits equal to the size of the video frame, and then transmit the retrieved video frame to the requesting client 12.

As another example, auxiliary file 40a may also include information to allow streamers 28 to synchronize portions of the modified content in transcoded media file 32a before streaming the relevant portions to client 12 and/or to allow clients 12 to synchronize portions of the modified content after streamers 28 have transmitted the relevant portions. For example, in particular embodiments, auxiliary file 40a may include information specifying an amount of content missing from transcoded media file 32a or from between consecutive portions of transcoded media file 32a (e.g., a number of frames dropped during transcoding from between two video frames of transcoded media file 32a), and streamers 28 may utilize this information in generating time stamps for content portions and/or packets used to transmit content, numbering frames or other portions of content, or for otherwise indicating to clients 12 a timing, spacing, or sequence for playback of the modified content so as to maintain synchronization during playback.

In general, however, auxiliary files 40 may include any appropriate information to permit, enable, or otherwise facilitate streamers 28 transmitting streamed media content 36 from transcoded media file 32 while modification of content from requested source media file 30 is ongoing. In particular embodiments, auxiliary files 40 may include information specifying a media type for content in associated portions of a transcoded media file 32, information indicating a resolution or screen-size for content in associated portions of a transcoded media file 32, and/or any other appropriate information associated with the relevant portions of a transcoded media file 32. Furthermore, streamers 28 may access and utilize the information stored in auxiliary files 40 in any suitable manner based on the configuration and capabilities of streamers 28 and the specific information stored in auxiliary files 40.

After client 12 begins to receive streamed media content 36 from the selected streamer 28, client 12 may initiate playback of streamed media content 36. In particular embodiments, client 12 initiates playback of the streamed media content 36 immediately or shortly after receiving it. Thus, in such embodiments, the fact that streamer 28 is able to begin transmitting transcoded content to the requesting client 12 while the selected transcoder 20 is still transcoding requested source media file 30a means that appropriately-transcoded content may be provided to the requesting client 12 with only a minimal delay between a user's request for content and playback of the content regardless of the capabilities or format requirements of the particular client 12 being utilized.

Additionally, in certain embodiments, system 10 may be configured so that if a second client 12 sends a second content request 42 to CMS 16 requesting the same requested source media file 30a in the same target format as the original content request 42 while the relevant transcoder 20 is still modifying the requested content, rather than repeating the process described above, CMS 16 may send a transcoding request 44 to LBS 18 identifying the requested source media file 30a and target format. LBS 18 may then send CMS 16 an identifier 49 associated with the transcoder 20 and/or streamer 28 that is currently modifying the requested content, or any other transcoder 20 and/or streamer 28. CMS 16 then directs the second client 12 to the transcoder 20 and/or streamer 28 performing the modification. Once the second client is in communication with the transcoder 20 and/or streamer 28, the second client may retrieve modified content at the same time as the original client 12.

When transcoder 20 completes modification of the requested content, transcoder 20 may indicate to LBS 18 and/or CMS 16 that modification is complete. In particular embodiments, transcoder 20 may send a message to the CMS 16 in response to which CMS 16 may direct transcoder 20 to continue storing the modified content in transcoded content store 24, send the modified content to cached content store 26, and/or delete the modified content from the transcoded content store 24. For example, in particular embodiments, transcoder 20 may transmit a message to CMS 16 specifying a URL address from which CMS 16 may retrieve the transcoded media file 32a. Alternatively, in particular embodiments, transcoder 20 may automatically store the completed transcoded media file 32a in cached content store 26 after modifying transcoded media file 32a. Likewise transcoder 20 may store, save, send, or delete auxiliary file 40a in any appropriate manner. For example, in particular embodiments, transcoder 20 may store both the completed transcoded media file 32a and the completed auxiliary file 40a in cached content store 26 once transcoding of requested source media file 30a is completed.

Thus, by allowing clients 12 to retrieve content from source media files 30 in a modified form before transcoders 20 have fully completed modifying the relevant source media files 30, system 10 may provide low-latency content delivery. Additionally, as a result of the ability of transcoder 20 to provide simultaneous, real-time modification, and of streamers 28 to provide delivery of modified content to multiple users, CMS 16 and cached content store 26 can store content in one or a select few frequently-requested output formats, but deliver requested content in a variety of formats with little to no increase in delivery times and quality. This may result in reduced storage requirements for cached content store 26 and may allow CMS 16 and cached content store 26 to service a greater number and variety of users and eliminate the time and expense of pre-transcoding all content to be stored on cached content store 26. Consequently, particular embodiments of system 10 may provide numerous operational benefits. Specific embodiments, however, may provide none, some, or all of these benefits.

Figure 2:
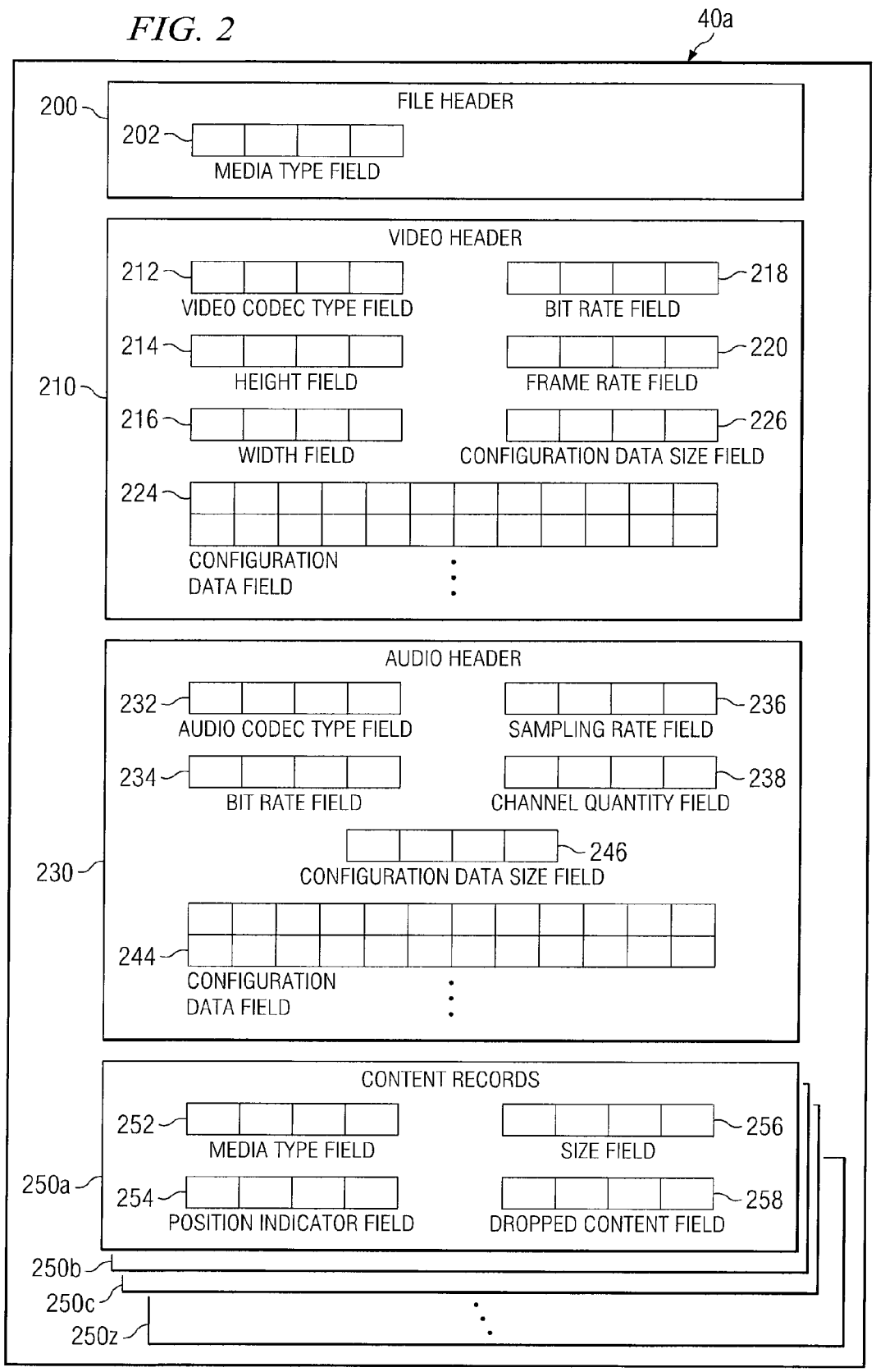
FIG. 2 illustrates an auxiliary file that may be utilized in particular embodiments of the system shown in FIG. 1.

FIG. 2 is a diagram illustrating in greater detail the contents and structure of auxiliary file 40a that may be generated by particular embodiments of transcoder 20 when completing the content delivery process described with respect to FIG. 1. As discussed above, a transcoder 20 generates auxiliary file 40a while transcoding content from requested source media file 30a to create the corresponding transcoded media file 32a. One or more streamers 28 may then access auxiliary file 40a while transcoding is still ongoing and utilize the information in the accessed auxiliary file 40a to facilitate transmission of media content from transcoded media file 32a before the relevant transcoder 20 has completed modification of transcoded media file 32a.

In the illustrated embodiment, auxiliary file 40a includes a file header 200, one or more media headers (including a video header 210 and an audio header 230), and one or more content records 250. While FIG. 2 and the description below describe a particular embodiment of auxiliary file 40a that includes certain information structured in a particular manner, auxiliary files 40 may include other appropriate information and/or be structured in a different manner than that described. In general, auxiliary files 40 may include any data appropriate to facilitate transmission of media content from transcoded media file 32a while the transcoder 20 responsible for generating transcoded media file 32a is still storing modified content in the relevant file. As a result, alternative embodiments of system 10 may generate auxiliary files 40 having some, none, or all of the elements described below and/or having elements in addition to those described below.

In the example auxiliary file 40a shown in FIG. 2, file header 200 holds general information relating to the media included in transcoded media file 32a described by auxiliary file 40a. As one example, in particular embodiments, this general information may include a media types field 202 identifying one or more media types for the modified media being written to transcoded media file 32a. For example, the illustrated auxiliary file 40a includes a media types field 202 that stores a four-byte value indicating the various media types included in transcoded media file 32a. If transcoded media file 32a includes only audio content, the transcoder 20 responsible for generating this auxiliary file 40a may store a value of "1" in the media types field 202. If, instead, transcoded media file 32a includes only video content or includes both audio and video content then the relevant transcoder 20 may store a value of "2" or a value of "3," respectively, in media types field 202 of the illustrated auxiliary file 40a.

Data in the media headers, such as video header 210 and audio header 230, is used by the selected streamer 28 to determine various properties of the different types of media included in transcoded media file 32a. Each media header may include information specific to the content of that type in transcoded media file 32a. For example, in the illustrated auxiliary file 40a, video header 210 holds information regarding video content in transcoded media file 32a such as, for example, a video codec type, a content size, a bit rate, and a frame rate. In the illustrated auxiliary file 40a, this data is stored in a video codec type field 212, multiple size fields (including a height field 214 and a width field 216), a bit rate field 218, and a frame rate field 220, respectively. In particular embodiments, video codec type field 212, height field 214, width field 216, bit rate field 218, and frame rate field 220 each store a four-byte value holding the relevant data.

Audio header 230 may include information similar to video header 210 but relating to audio information in transcoded media file 32a. For example, audio header 230 may include information such as an audio codec type, a bit rate, a sampling rate, and a number of audio channels encoded in the audio content of transcoded media file 32a. In the illustrated auxiliary file 40a, this data is stored in audio codec type field 232, bit rate field 234, sampling rate field 236, and channel quantity field 238, respectively. In particular embodiments, audio codec type field 232, bit rate field 234, sampling rate field 236, and channel quantity field 238 each store a four-byte value indicating the relevant data.

Additionally, certain target formats may utilize configuration information that is provided to the selected streamer 28 to allow the selected streamer 28 to transmit content from transcoded media file 32a and/or to the requesting client 12 to allow the requesting client 12 to receive or play content from transcoded media file 32a. For example, in particular embodiments, when transcoded media file 32a represents a 3GP file, streamer 28 may utilize a session description protocol (SDP) file to properly stream media content from the 3GP file to the requesting client 12. This SDP file may contain a specific type of configuration information, such as a configuration ("config") string, defining features of the encoded video and/or audio stream contained in transcoded media file 32a. This configuration string may be used by one or both of the selected streamer 28 and the requesting client 12 to properly configure themselves and/or the communication session over which content from transcoded media file 32a will be transmitted.

As a result, in certain embodiments, delays in transmitting modified content from transcoded media file 32a may be avoided by including configuration data in a configuration data field 224 of video header 210 and/or a configuration data field 244 of audio header 230. In particular embodiments, the amount of information stored in these fields may vary, and as a result, the value stored in the field may be padded to bring the amount of data up to a particular size. For example, in particular embodiments, configuration information stored in configuration data field 224 or 244 is padded so that 108 bytes of data are stored in these fields. The size of the actual configuration data stored in configuration data fields 224 and 244 may then be stored in a configuration data size field 226 and 246, respectively.

Configuration data field 224 of video header 210 and configuration data field 244 of audio header 230 may store any appropriate information to be utilized to configure the selected streamer 28, the requesting client 12, and/or the transmission session used to transmit content from transcoded media file 32a to the requesting client 12. For example, in certain embodiments, the responsible transcoder 20 may generate a config string from video or audio media in transcoded media file 32a during transcoding of the relevant media and store the generated config string within the appropriate configuration data field 224 or 244 of auxiliary file 40a. Utilizing this config string, the selected streamer 28 may then initiate an RTSP session with the requesting client 12 to transmit content from transcoded media file 32a.

Content records 250 include information regarding the structure and contents of transcoded media file 32a. Auxiliary file 40a may include multiple content records 250 each associated with a different portion of the content in transcoded media file 32a. As noted above, these different content portions of transcoded media file 32a may each represent a discrete portion of content (e.g., an individual frame or a predetermined number of frames) or arbitrarily-sized portions (e.g., a five-second portion of video data or a kilobyte-sized portion of audio data). In particular embodiments, each audio frame and each video frame in the associated transcoded media file 32a has a corresponding content record 250 in auxiliary file 40a.

Content records 250 may each include any appropriate information structured in any appropriate manner to allow the selected streamer 28 to access the associated portion of transcoded media file 32a associated with that content record 250 and transmit the associated portion to the requesting client 12. For purposes of illustration, the example content records 250 shown in FIG. 2 each include a media type field 252 indicating a type of content associated with the relevant content record 250 (e.g., Audio-1, Video-2), a position indicator field 254 indicating the location of the associated content portion in transcoded media file 32a, a size field 256 indicating the size of the associated content portion, and a dropped content field 258 indicating an amount of content (e.g., a number of frames) dropped during transcoding of the associated portion of media (or dropped in between the transcoding of the associated portion and the immediately preceding or succeeding portion).

Thus, in particular embodiments, when retrieving content from transcoded media file 32a for transmission to the requesting client 12, the selected streamer 28 may access a first content record 250 of auxiliary file 40a to determine a location of the modified content in transcoded media file 32a associated with the first content record 250. In particular, the selected streamer 28 may access the associated content portion by reading from a location within transcoded media file 32a (e.g., as measured by a number of bytes from the beginning of transcoded media file 32a) based on the position indicator field 254 of the first content record 250. The selected streamer 28 may then retrieve the associated portion of content by reading a quantity of data determined based on the size field 256 of the associated content record 250 and transmit the associated portion to the requesting client 12. The selected streamer 28 may then read another content record 250 and repeat the process. The selected streamer 28 may continue this process until reaching an appropriate stopping point, such as when the responsible transcoder 20 has completed modifying content for transcoded media file 32a and the selected streamer 28 has transmitted all the modified content to the requesting client 12. At the stopping point, the transcoder 20 may generate a content record 250 designated as an end-of-file record (shown in FIG. 2 as "content record 250z"), in which media type field 252 is set as "end-of-file" and other fields are set to zero.

Additionally, content records 250 may also include dropped content field 258 storing information regarding an amount of content dropped during transcoding. This information may allow the selected streamer 28 to transmit portions of a media file 30 with proper timing and synchronization. For example, in particular embodiments, each content record 250 is associated with a particular video frame in transcoded media file 32a, and the dropped content field 258 for a particular video frame indicates a number of video frames dropped between transcoding of that particular video frame and the transcoding of the immediately preceding video frame. In such embodiments, the selected streamer 28 may then utilize information in the dropped content field 258 of each content record 250 to increment timestamps for the associated video frames when transmitting to the requesting client 12. This may allow the selected streamer 28 and/or the requesting client to maintain audio-video synchronization during streaming of the requested content.

Figure 3:
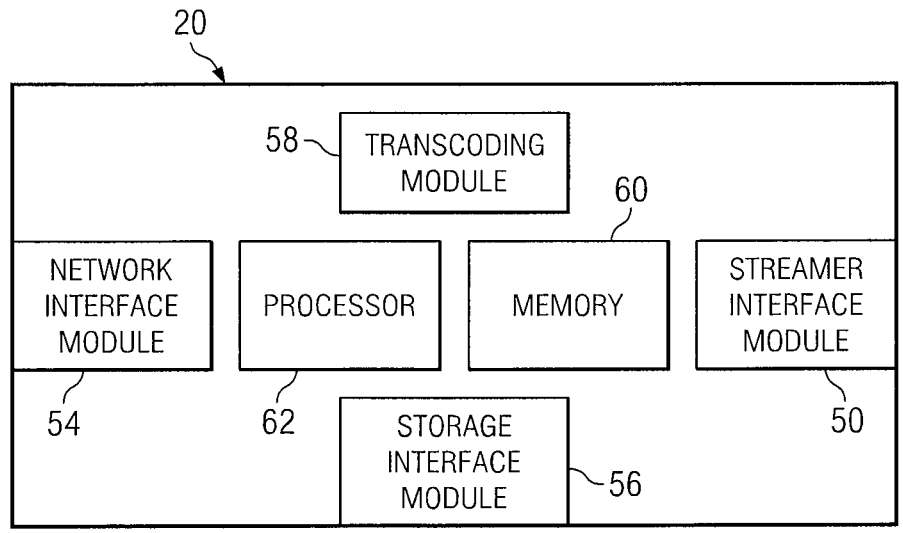
FIG. 3 is a functional diagram of a transcoder that may be utilized in particular embodiments of the system shown in FIG. 1.

FIG. 3 is a block diagram illustrating in greater detail the contents and operation of a particular embodiment of the transcoders 20 shown in FIG. 1. In general, as discussed above with respect to FIG. 1, transcoder 20 retrieves or otherwise receives content for delivery to clients 12, modifies the retrieved content in an appropriate manner, and generates a corresponding auxiliary file 40 to facilitate transmission of the modified content by streamer 28 and/or display of the modified content by the requesting client 12. As shown in FIG. 3, transcoder 20 may include a streamer interface module 50, a network interface module 54, a storage interface module 56, a transcoding module 58, a memory 60, and a processor 62.

Processor 62 may represent or include any form of processing component, including general purpose computers, dedicated microprocessors, or other processing devices capable of processing electronic information. Examples of processor 62 include digital signal processors (DSPs), application-specific integrated circuits (ASICs), field-programmable gate arrays (FPGAs), and any other suitable specific or general purpose processors. Although FIG. 3 illustrates a particular embodiment of transcoder 20 that includes a single processor 62, transcoder 20 may, in general, include any suitable number of processors 62.

Memory 60 stores processor instructions, codecs, and/or values and parameters utilized by transcoder 20 during operation. Memory 60 may comprise any collection and arrangement of volatile or non-volatile, components suitable for storing data, such as for example random access memory (RAM) devices, read only memory (ROM) devices, magnetic storage devices, optical storage devices, or any other suitable data storage devices. In particular embodiments, memory 60 may represent, in part, computer-readable media on which computer instructions are encoded. In such embodiments, some or all the described functionality of transcoder 20 may be provided by processor 62 executing the instructions encoded on the described media. Although shown in FIG. 3 as a single component, memory 60 may represent any number of memory elements within, local to, or accessible by transcoder 20.

Streamer interface module 50 couples transcoder 20 to one or more streamers 28 to facilitate communication and data flow between transcoder 20 and streamers 28. For example, transcoder 20 may transmit portions of a transcoded media file 32 and auxiliary file 40 to a selected streamer 20 through streamer interface module 50. In certain embodiments, communications and data flow between transcoder 20 and streamer 28 may alternatively occur via network interface module 54.

Network interface module 54 couples transcoder 20 to appropriate components of system 10 to facilitate communication over network 14 between transcoder 20 and streamers 28, LBS 18, CMS 16, clients 12, and/or other appropriate components of system 10 regarding content-delivery operations performed by transcoder 20. For example, transcoder 20 may receive transcoding requests 44 from LBS 18 and transmit content responses 46 to LBS 18 over network 14 through network interface module 54. In particular embodiments, network interface module 54 includes or represents one or more network interface cards (NICs) suitable for packet-based communication over network 14.

Transcoding module(s) 58 modifies content received by transcoder 20. In particular embodiments, transcoder 20 may include multiple transcoding modules 58 capable of translating, transcoding, transrating, and/or otherwise modifying various different types of received content based on a target format for a received request. In certain of the embodiments that include multiple transcoding modules 58, transcoding modules 58 may be capable of operating concurrently so that multiple sets of content can be modified simultaneously. As a result, transcoder 20 may provide a robust platform for use in high-traffic content-delivery systems.

Storage interface module 56 facilitates communication of content between transcoder 20 and various components of system 10. Specifically, transcoder 20 receives content from original content store 22 and communicates content to and from transcoded content store 24 through storage interface module 56. To support multiple simultaneous transcoding processes, storage interface module 56 may include multiple ports through which storage interface module 56 can receive/transmit multiple flows simultaneously from/to transcoded content store 24 and/or original content store 22.

In particular embodiments, original content store 22 and transcoded content store 24 are both remote from transcoder 20. As a result, in such embodiments, storage interface module 56 may represent, in part or in whole, elements of network interface module 54. In alternative embodiments, one or both of original content store 22 or transcoded content store 24 may represent memory components internal to transcoder 20, such as memory 60. In such embodiments, storage interface module 56 may represent, in whole or in part, a memory bus and/or other suitable components configured to communicate information between internal memory components and other components of transcoder 20.

In general, each of network interface module 54, transcoding module 58, and storage interface module 56 may represent any appropriate combination of hardware and/or software suitable to provide the described functionality. Additionally, any two or more of network interface module 54, transcoding module 58, and storage interface module 56 may represent or include common elements. In particular embodiments, network interface module 54, transcoding module 58, and storage interface module 56 represent, in part, software applications being executed by processor 62.

As one specific example, particular embodiments of transcoder 20 may contain a plurality of transcoding modules 58 with each transcoding module 58 representing or including a digital signal processor (DSP). Each DSP may have a portion of memory 60 local to that DSP in which appropriate information for encoding/decoding multiple different codecs is stored. As a result, transcoder 20 may provide a power-efficient, compact platform for realtime transcoding in a high-traffic system.

Figure 4:
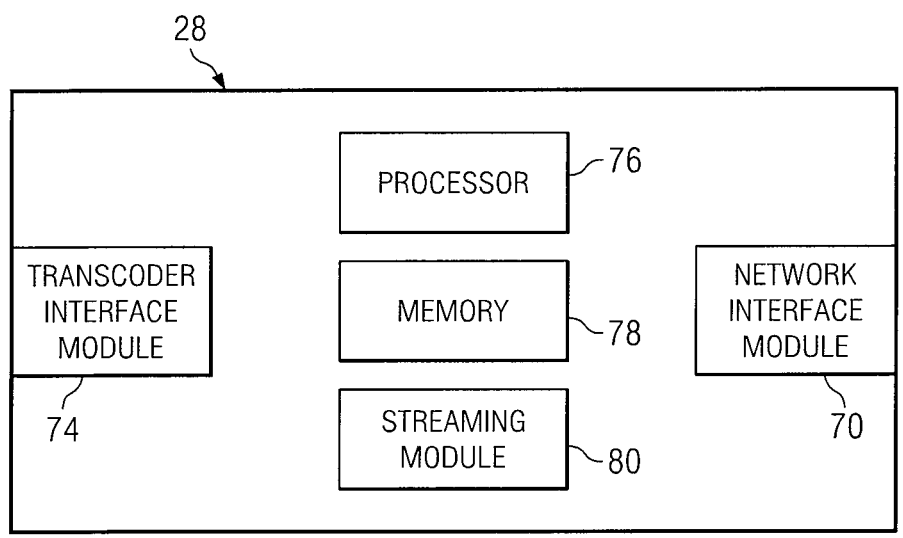
FIG. 4 is a functional diagram of a streamer that may be utilized in particular embodiments of the system shown in FIG. 1.

FIG. 4 is a block diagram illustrating in greater detail the contents and operation of a particular embodiment of streamer 28 shown in FIG. 1. In general, as discussed above with respect to FIGS. 1 and 2, streamer 50 receives, retrieves, or otherwise accesses transcoded media files 32 and auxiliary files 40 from transcoder 20 for transmission or delivery to clients 12. As shown in FIG. 4, streamer 28 may include a network interface module 70, a transcoder interface module 74, a processor 76, a memory 78, and a streaming module 80.

Processor 76 may represent or include any form of processing component, including general purpose computers, dedicated microprocessors, or other processing devices capable of processing electronic information. Examples of processor 76 include digital signal processors (DSPs), application-specific integrated circuits (ASICs), field-programmable gate arrays (FPGAs), and any other suitable specific or general purpose processors. Although FIG. 4 illustrates a particular embodiment of streamer 28 that includes a single processor 76, streamer 28 may, in general, include any suitable number of processors 76, and certain embodiments of streamer 28 may not include any processor 76.

Memory 78 stores processor instructions, codecs, and/or values and parameters utilized by streamer 28 during operation. Memory 78 may comprise any collection and arrangement of volatile or non-volatile, components suitable for storing data, such as for example random access memory (RAM) devices, read only memory (ROM) devices, magnetic storage devices, optical storage devices, or any other suitable data storage devices. In particular embodiments, memory 78 may represent, in part, computer-readable media on which computer instructions are encoded. In such embodiments, some or all the described functionality of streamer 28 may be provided by processor 76 executing the instructions encoded on the described media. Although shown in FIG. 4 as a single component, memory 78 may represent any number of memory elements within, local to, or accessible by streamer 28.

Transcoder interface module 74 couples streamer 28 to transcoder 20 to facilitate communication and data flow between streamer 28 and transcoder 20. For example, streamer 28 may receive portions of a transcoded media file 32 and auxiliary file 40 from transcoder 20 through streamer interface module 74. In certain embodiments, communications and data flow between streamer 28 and transcoder 20 may alternatively occur over network 14 via network interface module 70.

Network interface module 70 couples streamer 28 to appropriate components of system 10 to facilitate communication between streamer 28, transcoder 20, LBS 18, CMS 16, clients 12, and/or other appropriate components of system 10 regarding content-delivery operations performed by streamer 28. For example, streamer 28 may receive transcoding requests 44 from LBS 18 and transmit content responses 46 to LBS 18 through network interface module 54. In particular embodiments, network interface module 54 includes or represents one or more network interface cards (NICs) suitable for packet-based communication over network 14.

Streaming module(s) 80 transmit, stream, deliver, or otherwise send content received by streamer 28. In particular embodiments, streamer 28 may include multiple streaming modules 80 capable of transmitting requested content in a target format to clients 12 over network 14. In certain of the embodiments that include multiple streaming modules 80, streaming modules 80 may be capable of operating concurrently so that multiple sets of content can be transmitted simultaneously. As a result, streamer 28 may provide a robust platform capable of delivering multiple content streams in parallel.

In general, each of transcoder interface module 74, streaming module 80, processor 76, memory 78, and network interface module 70 may represent any appropriate combination of hardware and/or software suitable to provide the described functionality. Additionally, any two or more of transcoder interface module 74, streaming module 80, and network interface module 70 may represent or include common elements. In particular embodiments, transcoder interface module 74, streaming module 80, and network interface module 70 represent, in part, software applications being executed by processor 76.

Furthermore, in certain embodiments, transcoder 20 and streamer 28 may represent or include common elements. For example, in certain embodiments, transcoder 20 and streamer 28 may share common memory and processing components, and/or software modules. In some embodiments, CMS 16 and/or LBS 18 may additionally represent or include common elements with transcoder 20 and/or streamer 28.

Figure 5:
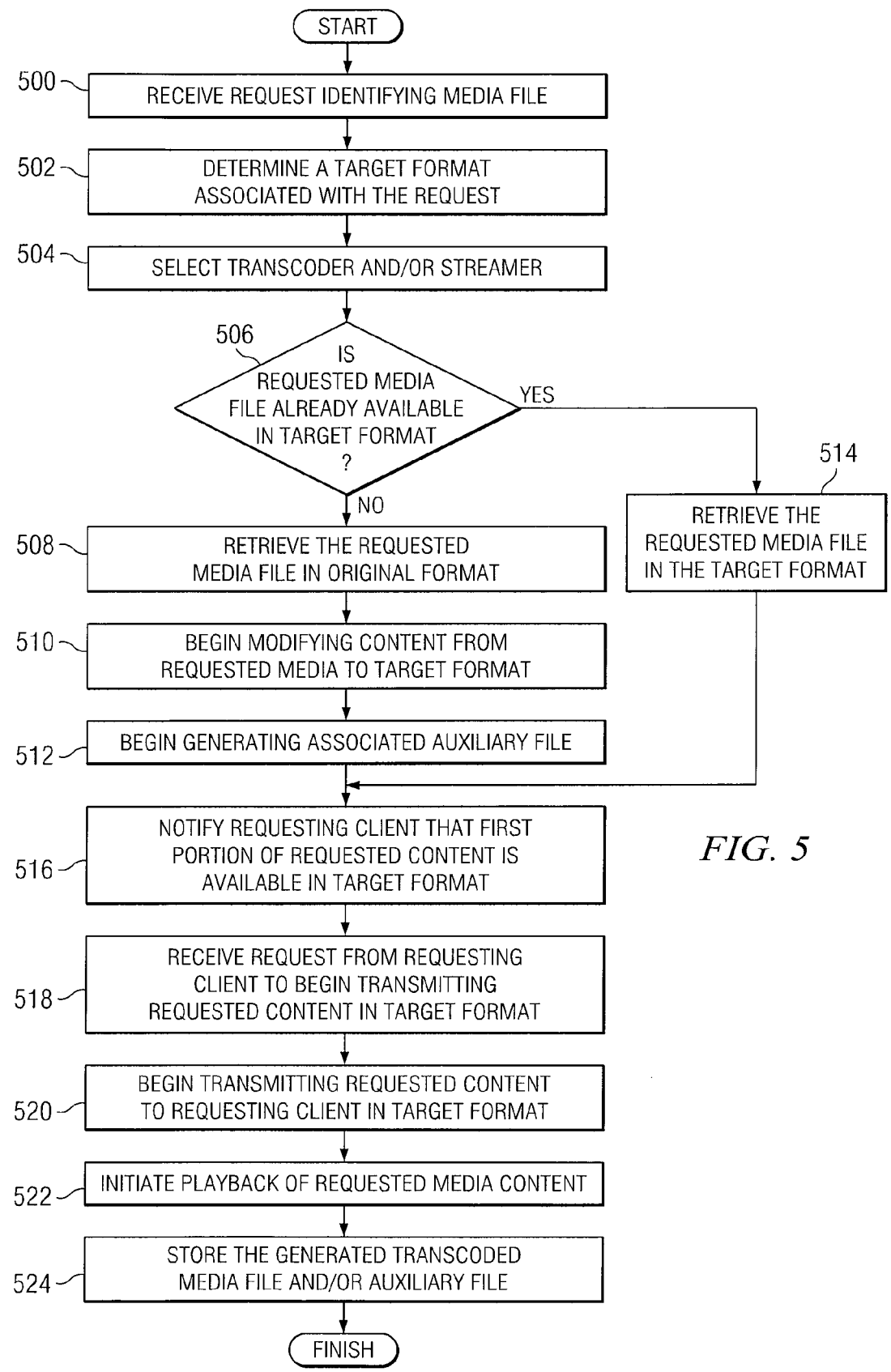
FIG. 5 is a flowchart detailing an example operation of a system for managing media in accordance with certain embodiments.

FIG. 5 is a flowchart illustrating operation of a particular embodiment of system 10 in delivering content to a requesting client 12. The steps illustrated in FIG. 5 may be combined, modified, or deleted where appropriate, and additional steps may also be added to the flowchart. Additionally, the steps may be performed in any suitable order without departing from the scope of the invention.

Operation, in the illustrated example, begins at step 500 with appropriate components of system 10 receiving a request identifying a media file 30. For example, CMS 16 may receive a content request 42 for a requested source media file 30a from a client 12. In particular embodiments, the requesting client 12 requests a particular media file from CMS 16 by transmitting an HTTP request to CMS 16 that identifies requested source media file 30a. The HTTP request may also specify information about the requesting client 12 and/or a requested display format so that the content can be modified in a manner appropriate for transmission to and display by the relevant client 12.

At step 502, transcoder 20 determines a target format associated with the request. Transcoder 20 may determine the target format for the requested media content based on the particular characteristics of client 12 or other appropriate considerations. The target format may represent a format that is appropriate for transmission to, receipt at, and/or playback by the requesting client 12, such as a computer 12a, cell phone 12b, or personal data assistant 12c.

At step 504, a transcoder 20 and/or streamer 28 is selected. In particular embodiments, CMS 16 and/or LBS 18 may be responsible for selecting a transcoder 20 and/or streamer 28 to modify and/or deliver the requested media file 30 according to the target format. CMS 16 and/or LBS 18 may select a particular transcoder 20 and streamer 28 to perform the modification based on availability, capacity, functionality, and/or any other appropriate factors or considerations.

At step 506, LBS 18 or transcoder 20 determines whether requested source media file 30a is already stored or otherwise available in the target format. For example, in particular embodiments, CMS 16 may determine whether cached content store 26 is storing a cached media file 34 that contains the content of the requested source media file 30a in the target format. If requested source media file 30a is already stored or available in the target format, operation proceeds to step 514 where the selected streamer 28 then retrieves requested source media file 30a from an appropriate content store in the target format and operation moves to step 516.

If requested source media file 30a is not available in the target format, at step 508, the selected transcoder 20 may retrieve requested source media file 30a for subsequent modification and transmission. At step 510, a selected transcoder 20 begins modifying content in the requested media file and generating transcoded media file 32a in the target format. Additionally, the selected transcoder 20 also begins generating an auxiliary file 40a associated with transcoded media file 32a at step 512. In particular embodiments, the selected transcoder 20 may generate transcoded media file 32a and auxiliary file 40a contemporaneously.

The requesting client 12 is notified that a first portion of transcoded media file 32a is available in the target format at step 516, and at step 518, streamer 28 and/or transcoder 20 receive a request from the requesting client 12 to begin transmission of the streaming file. At step 520, streamer 28 begins transmitting streamed media content 36 to the requesting client 12. If streamer 28 is transmitting streamed media content from a transcoded media file 32 (e.g., transcoded media file 32a) while content is still being written to the relevant transcoded media file 32, then streamer 28 may utilize a corresponding auxiliary file 40 (e.g., auxiliary file 40a) to facilitate access to and transmission of the content in the relevant transcoded media file 32. Additionally, in particular embodiments, streamer 28 may utilize auxiliary files 40 even if streaming from a completed transcoded media file 32 or from a cached media file 34. In alternative embodiments, however, streamer 28 may be configured to use auxiliary files 40 only if streaming transcoded media files 32 that are still being transcoded and may not utilize auxiliary files 40 when streaming from completed transcoded media files 32 or cached media files 34. After streamer 28 begins transmitting streamed media content 36 to the requesting client 12, the requesting client 12 initiates playback of streamed media content 36 at step 522.

The selected transcoder 20 may also store the generated transcoded media file 32a and/or auxiliary file 40a at step 524. The selected transcoder 20 may store transcoded media file 32a and/or auxiliary file 40a in an ongoing process during generation or may store these files once transcoder 20 completely finishes generating transcoded media file 32a. Operation of system 10 with respect to delivering requested source media file 30a may then end as shown in FIG. 5.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method comprising, by one or more computer systems:
receiving a request identifying a requested media file;
in response to receiving the request, accessing the requested media file, the requested media file comprising media content in a first format;
begin transcoding the media content from the first format to a second format and generating an associated auxiliary file comprising a plurality of content records in the second format;
transmitting the first portion of the media content in the second format to a requesting client utilizing the auxiliary file before the transcoding of the media content of the requested media file is complete;
wherein the auxiliary file comprises the plurality of content records, each of the content records being associated with a portion of the media content in the second format and indicating a location of the associated portion of the media content in the second format; and
wherein each of the content records comprises dropped-content information for an associated portion of the media content, the dropped-content information indicating an amount of content dropped during transcoding.

2. The method of claim 1, wherein the auxiliary file indicates a frame rate associated with the media content in the second format.

3. The method of claim 1, wherein the auxiliary file indicates a bit rate associated with the media content in the second format.

4. The method of claim 1, wherein the auxiliary file indicates a codec associated with the media content in the second format.

5. The method of claim 1, further comprising:
storing a modified-media file comprising the media content in the second format and the auxiliary file in a content store;
receiving a second request identifying the requested media file;
in response to the second request, retrieving the modified media file from the content store; and
transmitting the media content in the second format to a second requesting client utilizing the auxiliary file.

6. The method of claim 5, wherein the modified media file comprises a 3GP file.

7. The method of claim 1, wherein receiving the request identifying the requested media file comprises:
receiving the request transmitted from the requesting client; and
in response to receiving the request, selecting one of a plurality of transcoding elements to access the requested media file.

8. The method of claim 1, wherein accessing the requested media file comprises:
determining whether the requested media file is stored in a first content store in the second format; and
if the requested media file is not stored in the content store in the second format, transmitting a request to the first content store, the request identifying the requested media file; and
receiving the media file from the first content store in the first format.

9. The method of claim 8, wherein transmitting a request to the first content store comprises transmitting a Hypertext Transfer Protocol (HTTP) request identifying the media file to the first content store.

10. The method of claim 1, further comprising determining, based on the plurality of content records in the auxiliary file, one or more portions of the media file in the second format to transmit without the content records to the requesting client during a time that the media file in the second format is being generated.

11. An apparatus comprising:
one or more memory devices containing one or more instructions for execution by one or more processing devices; and
the processing devices configured to execute the instructions to:
receive a request identifying a requested media file;
in response to receiving the request, access the requested media file, the requested media file comprising media content in a first format;
begin to transcode the media content of the requested media file from the first format to a second format;
generate an associated auxiliary file;
transmit the first portion of the media content in the second format to a requesting client before the transcoding of the requested media file is complete, thereby reducing delay from the request and delivery of the media content to the requesting client;
wherein the auxiliary file comprises the plurality of content records, each of the content records being associated with a portion of the media content in the second format and indicating a location of the associated portion of the media content in the second format; and
wherein each of the content records comprises dropped-content information for an associated portion of the media content in the second format, wherein the dropped-content information indicates an amount of content dropped during transcoding.

12. The apparatus of claim 11, wherein the auxiliary file indicates a frame rate associated with the media content in the second format.

13. The apparatus of claim 11, wherein the auxiliary file indicates a bit rate associated with the media content in the second format.

14. The apparatus of claim 11, wherein the auxiliary file indicates a codec associated with the media content in the second format.

15. The apparatus of claim 11, wherein the processing devices are further configured to execute the instructions to:

store a modified media file comprising the media content in the second format and the auxiliary file in a content store;

receive a second request identifying the requested media file;

in response to the second request, retrieve the modified media file from the content store; and transmit the media content in the second format utilizing the auxiliary file to a second requesting client.

16. The apparatus of claim 15, wherein the modified media file comprises a 3GP file.

17. The apparatus of claim 11, wherein the processing devices are further configured to execute the instructions to receive the request
identifying a media file by:
receiving the request transmitted from the requesting client; and
in response to receiving the request, selecting one of a plurality of transcoding elements to access the requested media file.

18. The apparatus of claim 11, wherein the processing devices are further configured to execute the instructions to access the requested media file by:
determining whether the requested media file is stored in a first content store in the second format; and
if the requested media file is not stored in the content store in the second format, transmitting a request to the first content store, the request identifying the requested media file; and
receiving the media file from the first content store in the first format.

19. The apparatus of claim 18, wherein the processing devices are further configured to execute the instructions to transmit a request to the first content store by transmitting a Hypertext Transfer Protocol (HTTP) request identifying the media file to the first content store.

20. The apparatus of claim 11, wherein the processing devices are further configured to determine, based on the plurality of content records in the auxiliary file, one or more portions of the media file in the second format to transmit without the content records to the requesting client during a time that the media file in the second format is being generated.

21. The apparatus of claim 11, wherein the auxiliary file is stored in a content store to facilitate transmission of the media content in the second format to another requesting client.

22. One or more computer-readable non-transitory storage media embodying logic that is configured to, when executed:
receive a request identifying a requested media file;
in response to receiving the request, access the requested media file, the requested media file comprising media content in a first format;
begin to transcode the media content from the first format to a second format and generate an associated auxiliary file comprising a plurality of content records;
transmit the first portion of the media content in the second format to a requesting device utilizing the auxiliary file before the transcoding of the media content is complete;
wherein the auxiliary file comprises the plurality of content records, each of the content records being associated with a portion of the media content in the second format and indicating a location of the associated portion of the media content in the second format; and
wherein each of the content records comprises dropped-content information for an associated portion of the media content in the second format, wherein the dropped-content information indicates an amount of content dropped during transcoding.

23. The one or more computer-readable non-transitory storage media of claim 22, wherein, when executed, the logic is further configured to:
store a modified-media file comprising the media content in the second format in a content store;
receive a second request identifying the requested media file;
in response to the second request, retrieve the modified media file from the content store; and
transmit the modified media file to a second requesting client.

* * * * *